(12) United States Patent
Lee et al.

(10) Patent No.: US 8,161,093 B2
(45) Date of Patent: Apr. 17, 2012

(54) COMPLEX MULTIPLIER AND TWIDDLE FACTOR GENERATOR

(75) Inventors: Young-Ha Lee, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1238 days.

(21) Appl. No.: 11/862,055

(22) Filed: Sep. 26, 2007

(65) Prior Publication Data

US 2008/0140747 A1   Jun. 12, 2008

(30) Foreign Application Priority Data

Dec. 6, 2006 (KR) .................. 10-2006-0122920
Feb. 26, 2007 (KR) .................. 10-2007-0018935

(51) Int. Cl.
*G06F 7/52* (2006.01)
(52) U.S. Cl. ............... 708/622; 708/404; 708/403
(58) Field of Classification Search ............. None
See application file for complete search history.

(56) References Cited

U.S. PATENT DOCUMENTS

| 6,230,176 | B1 * | 5/2001 | Mizutani ............. 708/404 |
| 2005/0015420 | A1 * | 1/2005 | Gibb et al. ............ 708/404 |
| 2005/0078649 | A1 | 4/2005 | Tehrani et al. |

FOREIGN PATENT DOCUMENTS

KR   1998057068 A1   9/1998

OTHER PUBLICATIONS

Hara et al., "A Pre-FFT OFDM Adaptive Antenna Array with Eigenvector Combining", 2004, pp. 2412-2416, IEEE Communications Society.

* cited by examiner

*Primary Examiner* — Lewis A Bullock, Jr.
*Assistant Examiner* — Michael D Yaary
(74) *Attorney, Agent, or Firm* — Jefferson IP Law, LLP

(57) ABSTRACT

The present invention relates to a complex multiplier and a twiddle factor generator. The complex multiplier according to an embodiment of the invention includes: a first adder/subtracter that adds the real part of the complex number and a first twiddle factor or subtracts the first twiddle factor from the real part of the complex number according to a first signal; a second adder/subtracter that adds the imaginary part of the complex number and a second twiddle factor or subtracts the second twiddle factor from the imaginary part of the complex number according to a second signal; a first multiplier that multiplies the value obtained by the first adder/subtracter by a third twiddle factor and outputs the resulting value; a second multiplier that multiplies the value obtained by the second adder/subtracter by a fourth twiddle factor and outputs the resulting value; a multiplexer that selectively outputs the values output from the first and second multipliers as a real part output signal and an imaginary part output signal according to a third signal; and a controller that provides the first to third signals. According to the present invention, it is possible to achieve a complex multiplier having a simple hardware design.

11 Claims, 6 Drawing Sheets

US 8,161,093 B2

COMPLEX MULTIPLIER AND TWIDDLE FACTOR GENERATOR

CROSS-REFERENCE TO RELATED APPLICATION

This application claims priority to and the benefit of Korean Patent Application No. 10-2006-0122920 filed in the Korean Intellectual Property Office on Dec. 6, 2006, and No. 10-2007-0018935 filed in the Korean Intellectual Property Office on Feb. 26, 2007, the entire contents of which are incorporated herein by reference.

BACKGROUND OF THE INVENTION (a) Field of the Invention

The present invention relates to a complex multiplier and a twiddle factor generator.

(b) Description of the Related Art

Complex multipliers perform complex multiplication. In recent years, a complex multiplier for phase rotation has been provided in a fast Fourier transformer (FFT) used for orthogonal frequency division multiplexing (OFDM) that is generally applied to a modulating/demodulating method in a mobile communication system.

In general, the FFT includes a complex multiplier and a twiddle factor generator, which generates a twiddle factor corresponding to a phase rotation value, in order to perform a phase rotation. The complex multiplier includes four multipliers to multiply an input complex number by the twiddle factor transmitted from the twiddle factor generator.

However, the multipliers take up a lot of space in the FFT, which causes the design of a hardware structure to be complicated. Therefore, a technique for reducing the number of multipliers included in the complex multiplier is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a complex multiplier and a twiddle factor generator capable of simplifying the design of a hardware structure.

According to an embodiment of the invention, there is provided a complex multiplier that multiplies an input complex number by a twiddle factor and outputs the resulting value. The complex multiplier includes: a first adder/subtracter that adds a real part of the complex number and a first twiddle factor or subtracts the first twiddle factor from the real part of the complex number according to a first signal; a second adder/subtracter that adds the imaginary part of the complex number and a second twiddle factor or subtracts the second twiddle factor from the imaginary part of the complex number according to a second signal; a first multiplier that multiplies the value obtained by the first adder/subtracter by a third twiddle factor and outputs the resulting value; a second multiplier that multiplies the value obtained by the second adder/subtracter by a fourth twiddle factor and outputs the resulting value; a multiplexer that selectively outputs the values output from the first and second multipliers as a real part output signal and an imaginary part output signal according to a third signal; and a controller that provides the first to third signals.

According to another embodiment of the invention, there is provided a twiddle factor generator that generates a twiddle factor corresponding to a predetermined phase rotation value and transmits the twiddle factor to a complex multiplier. The twiddle factor generator includes: a first twiddle factor generating unit that multiplies a first or second function corresponding to the phase rotation value in a first area in which the first function is linear and a second area in which the second function is linear by the real part and the imaginary part of an input complex number to calculate a first value and a second value; and a second twiddle factor generating unit that calculates a third value, which is the value of a third function that is a sine function corresponding to the phase rotation value, and a fourth value, which is the value of a fourth function that has a phase difference of 90 degrees from the third function.

DETAILED DESCRIPTION OF THE EMBODIMENTS

Figure 1:
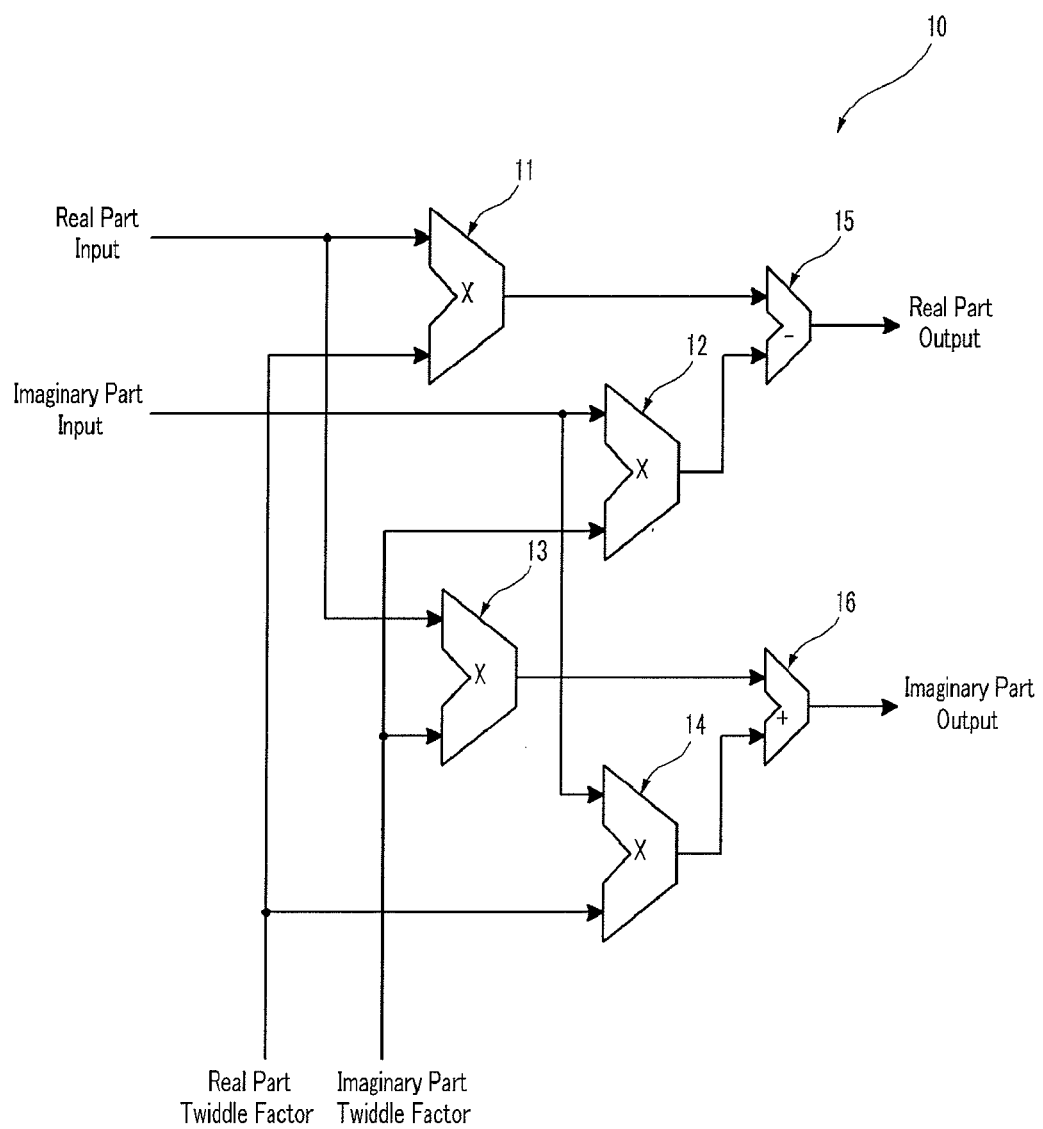
FIG. 1 is a block diagram illustrating a complex multiplier 10 according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and "comprising", when used in this specification, specify the presence of stated features, integers, steps, operations, elements, and/or components, but do not preclude the presence or addition of one or more other features, integers, steps, operations, elements, components, and/or groups thereof. In addition, the term "unit", "~or/er", "module", or "block" means a unit for performing at least one function or operation, and may be realized by a hardware component or a combination of hardware and software components.

Hereinafter, a complex multiplier and a twiddle factor generator according to exemplary embodiments of the present invention will be described in detail with reference to the accompanying drawings.

FIG. 1 is a block diagram illustrating the structure of a general complex multiplier 10.

As shown in FIG. 1, the general complex multiplier 10 includes first to fourth multipliers 11 to 14, a subtracter 15, and an adder 16.

The first multiplier 11 multiplies the real part of a complex number input to the complex multiplier 10 by a real part twiddle factor that is stored in a twiddle factor generator.

The second multiplier 12 multiplies the imaginary part of the complex number input to the complex multiplier 10 by an imaginary part twiddle factor that is stored in the twiddle factor generator.

The third multiplier 13 multiplies the real part of the complex number input to the complex multiplier 10 by the imaginary part twiddle factor that is stored in the twiddle factor generator.

The fourth multiplier 14 multiplies the imaginary part of the complex number input to the complex multiplier 10 by the real part twiddle factor that is stored in the twiddle factor generator.

The subtracter 15 calculates the difference between the output of the first multiplier 11 and the output of the second multiplier 12 to generate a sub-output signal.

The adder 16 adds the output of the third multiplier 13 and the output of the fourth multiplier 14 to generate an imaginary part output signal.

Meanwhile, complex multiplication between two complex numbers can be represented by Equation 1 given below.

$$(a+jb)\cdot(c+jd)=(a\cdot c-b\cdot d)+j(a\cdot d+b\cdot c), \qquad \text{[Equation 1]}$$

Herein, a, b, c, and d are real numbers.

A fast Fourier transformer (FFT) rotates an input complex number by θ. When a complex number (a+jb) is input, phase rotation by the FFT can be represented by Equation 2 given below.

$$\begin{aligned}(a+jb)\cdot e^{j\theta} &= (a+jb)\cdot(\cos\theta + j\sin\theta) \\ &= (a\cdot\cos\theta - b\cdot\sin\theta) + \\ &\quad j(a\cdot\sin\theta + b\cdot\cos\theta),\end{aligned} \qquad \text{[Equation 2]}$$

Herein, $e^{j\theta}$ is a twiddle factor.

The complex multiplication shown in Equation 2 includes four multiplications a·cos θ, b·sin θ, a·sin θ, and b·cos θ, one addition, and one subtraction. In this case, the values of the cosine and sine functions are calculated by the twiddle factor generator and then input to the first to fourth multipliers 11 to 14 of the complex multiplier 10. The complex multiplier 10 shown in FIG. 1 includes the first to fourth multipliers 11 to 14, the subtracter 15, and the adder 16, in order to perform the complex multiplication expressed by Equation 2 on the basis of the values of the cosine and sine functions output from the twiddle factor generator.

Meanwhile, since $$\frac{\sin\theta}{\cos\theta} = \tan\theta,$$

Equation 2 can be expressed by the following Equation 3 including tan θ.

$$(a\cdot\cos\theta - b\cdot\sin\theta) + j(a\cdot\sin\theta + b\cdot\cos\theta) = \qquad \text{[Equation 3]}$$
$$\cos\theta\cdot(a - b\cdot\tan\theta) + j\cos\theta\cdot(a\cdot\tan\theta + b)$$
$$\cos\theta \neq 0.$$

In addition, since $$\frac{\cos\theta}{\sin\theta} = \frac{1}{\tan\theta} = \cot\theta,$$

Equation 2 can be expressed by the following Equation 4 including cot θ.

$$(a\cdot\cos\theta - b\cdot\sin\theta) + j(a\cdot\sin\theta + b\cdot\cos\theta) = \qquad \text{[Equation 4]}$$
$$\sin\theta\cdot(a\cdot\cot\theta - b) + j\sin\theta\cdot(a + b\cdot\cot\theta)$$
$$\sin\theta \neq 0.$$

In the range of 0≦θ<2π, the distributions of the tangent and cotangent functions will be described with reference to FIG. 2.

Figure 2:
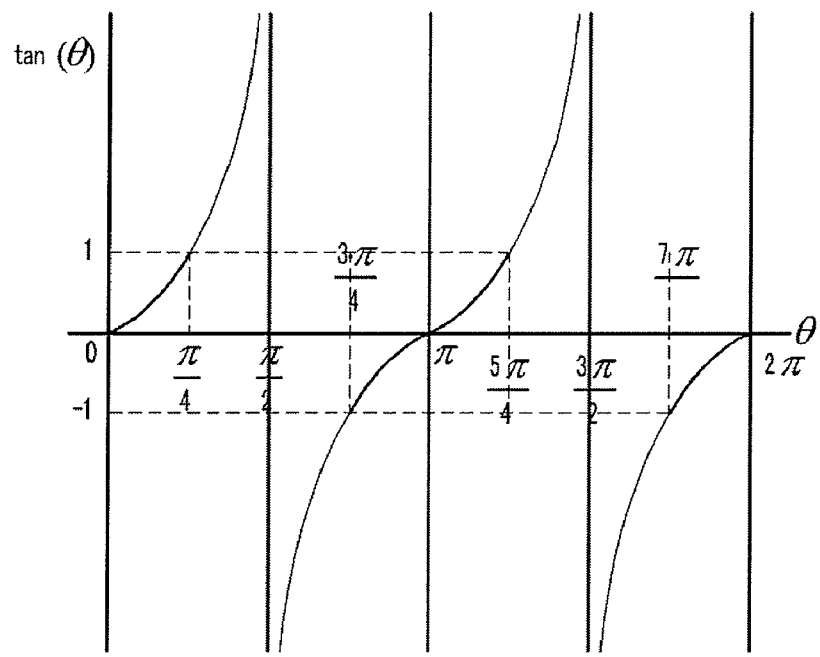
FIG. 2 is a diagram illustrating a tangent function and a cotangent function in the range of $0 \leq \theta < 2\pi$.
Figure 2:
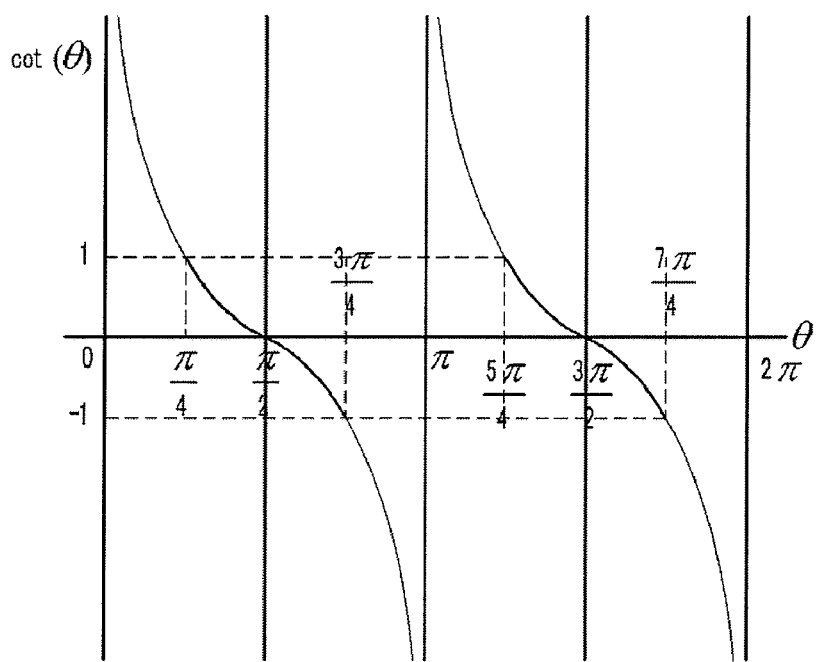

FIG. 2 shows the tangent and cotangent functions in the range of 0≦θ<2π.

As shown in FIG. 2, the tangent function is linear in the range of $$0 \le \theta < \frac{\pi}{4}, \ \frac{3\pi}{4} \le \theta < \frac{5\pi}{4}, \ \text{and} \ \frac{7\pi}{4} \le \theta < 2\pi,$$

and the cotangent function is linear in the range of $$\frac{\pi}{4} \le \theta < \frac{3\pi}{4} \ \text{and} \ \frac{5\pi}{4} \le \theta < \frac{7\pi}{4}.$$

In FIG. 2, portions in which the tangent and cotangent functions are linear are represented by solid lines. When the tangent and cotangent functions shown in FIG. 2 overlap each other, a graph shown in FIG. 3 is obtained.

Figure 3:
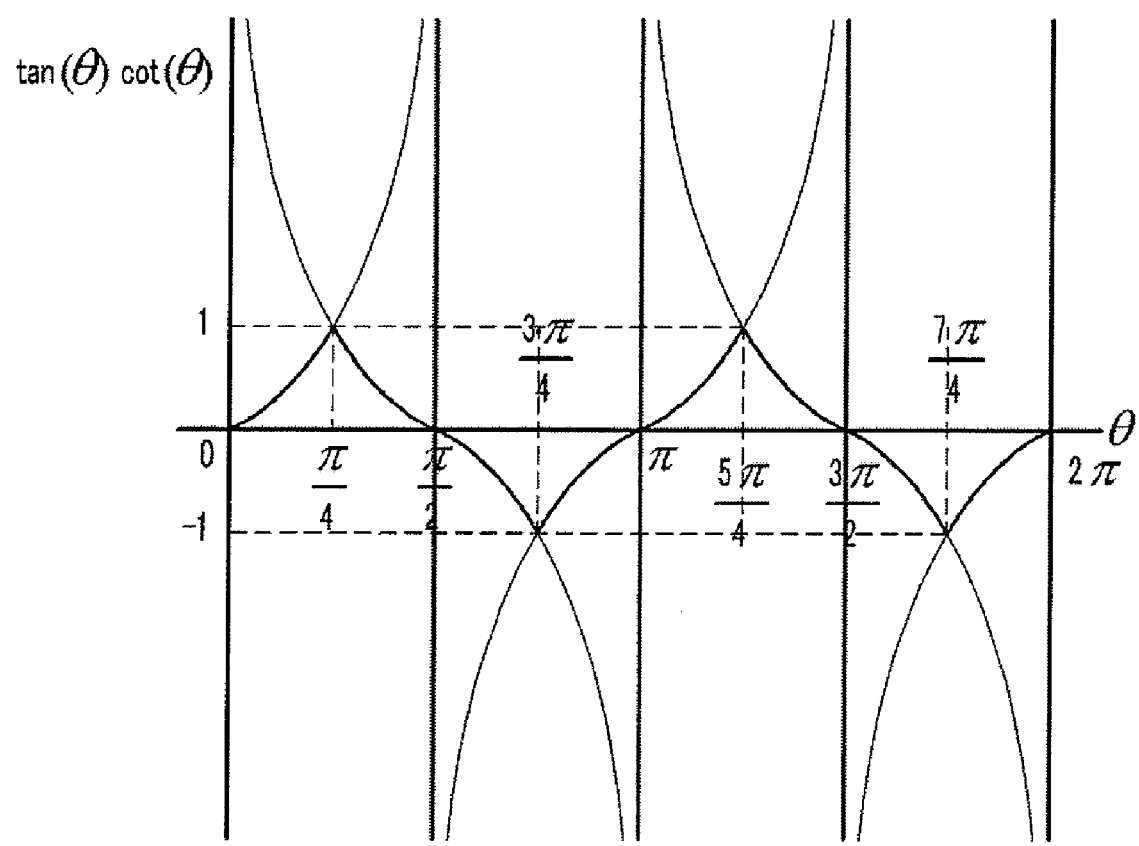
FIG. 3 is a diagram illustrating the overlap between the tangent function and the cotangent function in the range of $0 \leq \theta < 2\pi$.

FIG. 3 is a diagram illustrating the overlap of the tangent and cotangent functions in the range of 0≦θ<2π.

The tangent and cotangent functions in Equations 3 and 4 are calculated by using portions in which the tangent and cotangent functions are linear in FIG. 3 and a phase rotation value, and an approximate value of the twiddle factor is calculated on the basis of the tangent and cotangent functions. The twiddle factor generator 100 that calculates a·tan θ in Equation 3 or a·cot θ in Equation 4 on the basis of whether the phase rotation value exists in the portion in which the tangent function is linear or the portion in which the cotangent function is linear will be described with reference to FIGS. 4 and 5. For reference, in the following description, it is assumed that a complex number (a+jb) is input to the FFT. Referring to Equation 2, the twiddle factor $e^{j\theta}$ is equal to cos θ+j sin θ, and thus the cosine and sine functions are generally called a real part twiddle factor and an imaginary part twiddle factor, respectively. However, in the following description, the values a·tan θ, b·tan θ, a·cot θ, and b·cot θ in Equations 3 and 4 are also referred to as twiddle factors.

Figure 4:
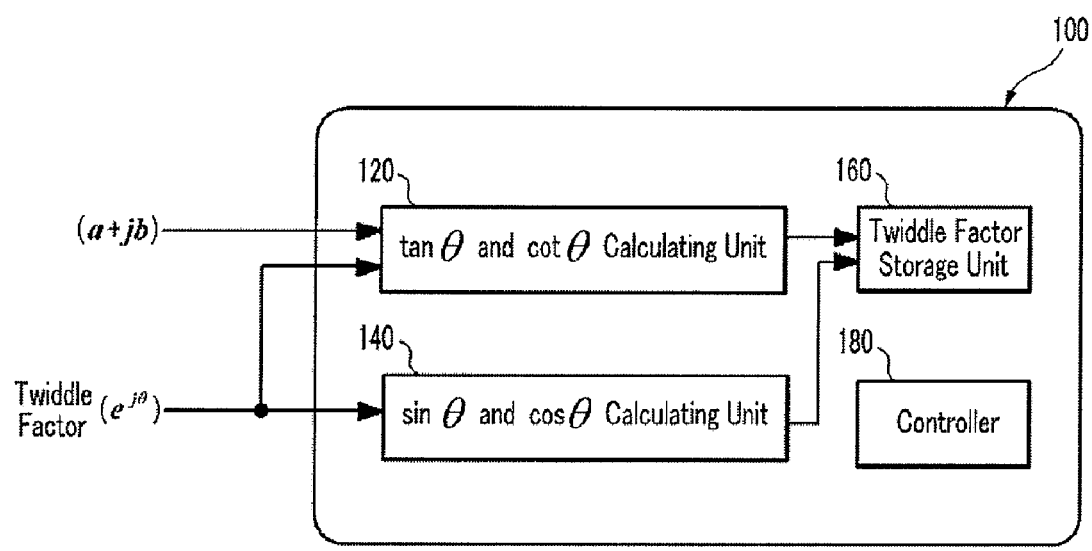
FIG. 4 is a block diagram illustrating a twiddle factor generator 100 according to an exemplary embodiment of the present invention.

FIG. 4 is a block diagram illustrating the twiddle factor generator 100 according to an exemplary embodiment of the present invention.

As shown in FIG. 4, the twiddle factor generator 100 according to the exemplary embodiment of the present invention includes a tan θ and cot θ calculating unit 120, a sin θ and cos θ calculating unit 140, a twiddle factor storage unit 160, and a controller 180.

When a complex number (a+jb) and a twiddle factor $e^{j\theta}$ corresponding to a predetermined phase rotation value are input, the tan θ and cot θ calculating unit 120 calculates a·tan θ and b·tinθ or a·cot θ and b·cot θ, and transmits the calculated values to the twiddle factor storage unit 160.

The sin θ and cos θ calculating unit 140 calculates values sin θ and cos θ corresponding to the twiddle factor $e^{jθ}$, and transmits the calculated values to the twiddle factor storage unit 160.

The twiddle factor storage unit 160 stores the values transmitted from the tan θ and cot θ calculating unit 120 and the sin θ and cos θ calculating unit 140, and outputs the stored values under the control of the controller 180.

The controller 180 controls the tan θ and cot θ calculating unit 120, the sin θ and cos θ calculating unit 140, and the twiddle factor storage unit 160.

Next, the tan θ and cot θ calculating unit 120 of the twiddle factor generator 100 according to the exemplary embodiment of the present invention will be described with reference to FIG. 5.

Figure 5:
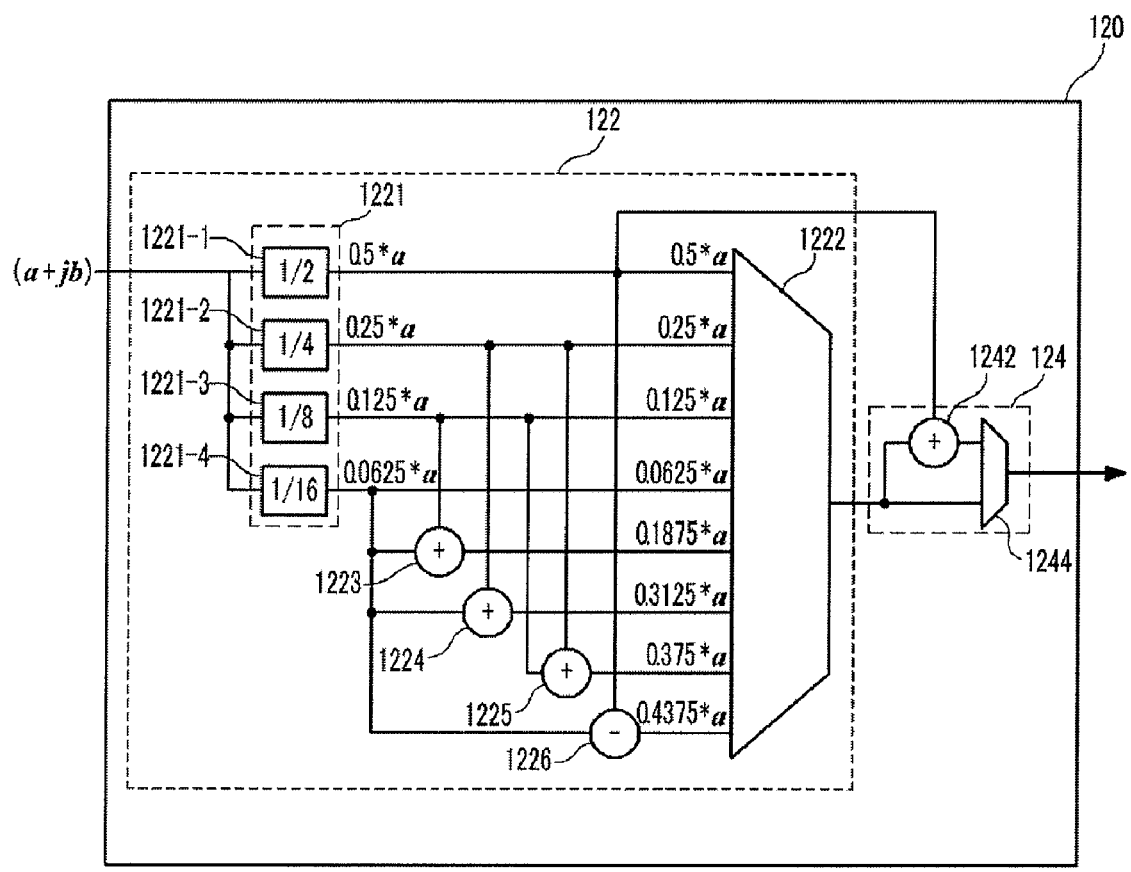
FIG. 5 is a block diagram illustrating a tan $\theta$ and cot $\theta$ calculating unit 120 according to an exemplary embodiment of the present invention.

FIG. 5 is a block diagram illustrating the structure of the tan θ and cot θ calculating unit 120 according to the exemplary embodiment of the present invention.

As shown in FIG. 5, the tan θ and cot θ calculating unit 120 according to the exemplary embodiment of the present invention includes a twiddle factor calculating unit 122 and a twiddle factor determining unit 124.

The twiddle factor calculating unit 122 includes a low-order bit removing unit 1221, a twiddle factor selecting unit 1222, adders 1223 to 1225, and a subtracter 1226.

The low-order bit removing unit 1221 includes first to fourth low-order bit removing units 1221-1 to 1221-4. The first to fourth low-order bit removing units 1221-1 to 1221-4 divide an input signal by different multiples of 2, that is, 2, 4, 8, and 16, respectively, and output the divided values. In this embodiment, the first to fourth low-order bit removing units 1221-1 to 1221-4 are just illustrative and the invention is not limited thereto. For example, the low-order bit removing unit 1221 may further include fifth to N-th bit removing units that divide an input signal by 32 to $2^N$.

The twiddle factor selecting unit 1222 is a multiplexer that selects one of the output signals of the low-order bit removing unit 1221 and transmits the selected signal to the twiddle factor determining unit 124 under the control of the controller 180.

The twiddle factor determining unit 124 includes an adder 1242 and a multiplexer 1244. The twiddle factor determining unit 124 transmits the output signal of the twiddle factor selecting unit 1222 to the twiddle factor storage unit 130, or adds the output signal of the twiddle factor selecting unit 1222 and an output signal of the first low-order bit removing unit 1221-1 and transmits the added value to the twiddle factor storage unit 130, under the control of the controller 180.

Next, the operation of the tan θ and cot θ calculating unit 120 according to the exemplary embodiment of the present invention will be described. For reference, in the complex number (a+jb), a and b are all binary bits, and the tan θ and cot θ calculating unit 120 according to the exemplary embodiment of the present invention processes a, which is a real part, and b, which is an imaginary part, in the same manner. Next, the operation of the tan θ and cot θ calculating unit 120 according to the exemplary embodiment of the present invention processing a, which is the real part, will be described.

First, assuming that a is a 5-bit signal "10000", the first low-order bit removing unit 1221-1 removes the least significant bit from "10000", and outputs "1000", which corresponds to a value obtained by dividing a by 2. The second low-order bit removing unit 1221-2 removes two low-order bits from "10000" and outputs "100", which corresponds to a value obtained by dividing a by 4. The third low-order bit removing unit 1221-3 removes three low-order bits from "10000" and outputs "10", which corresponds to a value obtained by dividing a by 8, and the fourth low-order bit removing unit 1221-4 removes four low-order bits from "10000" and outputs "1", which corresponds to a value obtained by dividing a by 16. In this way, when the first to fourth low-order bit removing units 1221-1 to 1221-4 remove a predetermined number of low-order bits, 0.5*a, 0.25*a, 0.125*a, and 0.0625*a are output from the first to fourth low-order bit removing units 1221-1 to 1221-4, respectively, as shown in FIG. 4.

The signals output from the first to fourth low-order bit removing units 1221-1 to 1221-4 are transmitted to the twiddle factor selecting unit 1222, and the controller 180 controls the twiddle factor selecting unit 1222 to transmit a value closest to a predetermined phase rotation value to the twiddle factor determining unit 124.

Meanwhile, the signals output from the first to fourth low-order bit removing units 1221-1 to 1221-4 correspond to values obtained by dividing an input signal a by different multiples of 2, and the difference between the output signals and the predetermined phase rotation value may be equal to or larger than a predetermined level. In order to compensate for the level difference, the twiddle factor calculating unit 122 includes the adders 1223 to 1225 and the subtracter 1226, and uses these adders 1223 to 1225 and the subtracter 1226 to perform an addition operation or a subtraction operation on the signals output from the first to fourth low-order bit removing units 1221-1 to 1221-4. Then, the twiddle factor calculating unit 122 transmits the operated value to the twiddle factor selecting unit 1222. The adders 1223 to 1225 and the subtracter 1226 are just illustrative examples and the invention is not limited thereto. For example, the twiddle factor calculating unit 122 may include a larger number of adders and subtracters than those shown in FIG. 4. The number of adders and subtracters depends on a network environment of the FFT including the twiddle factor generator 100 according to the exemplary embodiment of the present invention.

Meanwhile, among the values input to the twiddle factor selecting unit 1222, the maximum value is set to 0.5*a, which is half the input value a. The twiddle factor determining unit 124 uses the adder 1242 to add the signal output from the twiddle factor selecting unit 1222 and the signal output from the first low-order bit removing unit 1221-1, and outputs the added value. This setting process will be described below.

Assuming that the number of samples of θ that are set for phase conversion is "8", the overall phase angle 2π is divided by "8". Therefore, in the linear distribution area of the tangent and cotangent functions shown in FIG. 3, the value of the tangent or cotangent function corresponding to a phase rotation value is one of the values "0", "1", "0", and "−1". However, in general, several tens or several hundreds of samples of θ are used, and the absolute value of the tangent or cotangent function corresponding to the phase rotation value is within the range of 0 to 0.5 or within the range of 0.5 to 1. When the absolute value of the tangent or cotangent function corresponding to the phase rotation value is with the range of 0 to 0.5, the controller 180 controls the twiddle factor selecting unit 1222 to select a value close to the phase rotation value among the input values and to output the selected value to the twiddle factor determining unit 124. On the other hand, when the absolute value of the tangent or cotangent function corresponding to the phase rotation value is larger than 0.5, the controller 180 controls the twiddle factor selecting unit 1222 to select one of the input values that is approximate to a value obtained by subtracting 0.5 from the phase rotation value, and to output the approximate value to the twiddle factor determining unit 124. The controller 180 controls the twiddle factor determining unit 124 to add the signal output from the twiddle factor selecting unit 1222 and the signal output from the first low-order bit removing unit 1221-1, and to output the added value to the twiddle factor storage unit 160. Therefore, the value transmitted to the twiddle factor storage unit 160 by the twiddle factor determining unit 124 is equal to a value obtained by multiplying a, which is the real part of the complex number (a+jb) input to the FFT, by tan θ or cot θ. In this case, when the phase rotation value exists in an area in which the tangent function is linear in FIG. 3, the output value of the twiddle factor determining unit 124 is equal to a·tan θ, and when the phase rotation value exists in an area in which the cotangent function is linear in FIG. 3, the output value of the twiddle factor determining unit 124 is equal to a·cot θ in Equation 4.

Meanwhile, the twiddle factor generator 100 according to the exemplary embodiment of the present invention processes b, which is the imaginary part of the complex number (a+jb) input to the FFT, in the same manner as that in which the real part a is processed. In this case, when the phase rotation value exists in an area in which the tangent function is linear in FIG. 3, the output value of the twiddle factor determining unit 124 is equal to b·tan θ in Equation 3, and when the phase rotation value exists in an area in which the cotangent function is linear in FIG. 3, the output value of the twiddle factor determining unit 124 is equal to b·θcot θ in Equation 4.

In this embodiment, the same phase rotation value is applied to a and b, which are the real part and the imaginary part of the complex number (a+jb) input to the FFT. Therefore, the twiddle factor generator 100 according to the exemplary embodiment of the present invention outputs the values a·tan θ and b·tan θ, or the values a·cot θ and b·cot θ.

Next, a complex multiplier 200 for performing complex multiplication on the basis of the twiddle factor provided from the twiddle factor generator 100 according to an exemplary embodiment of the present invention will be described with reference to FIG. 6.

Figure 6:
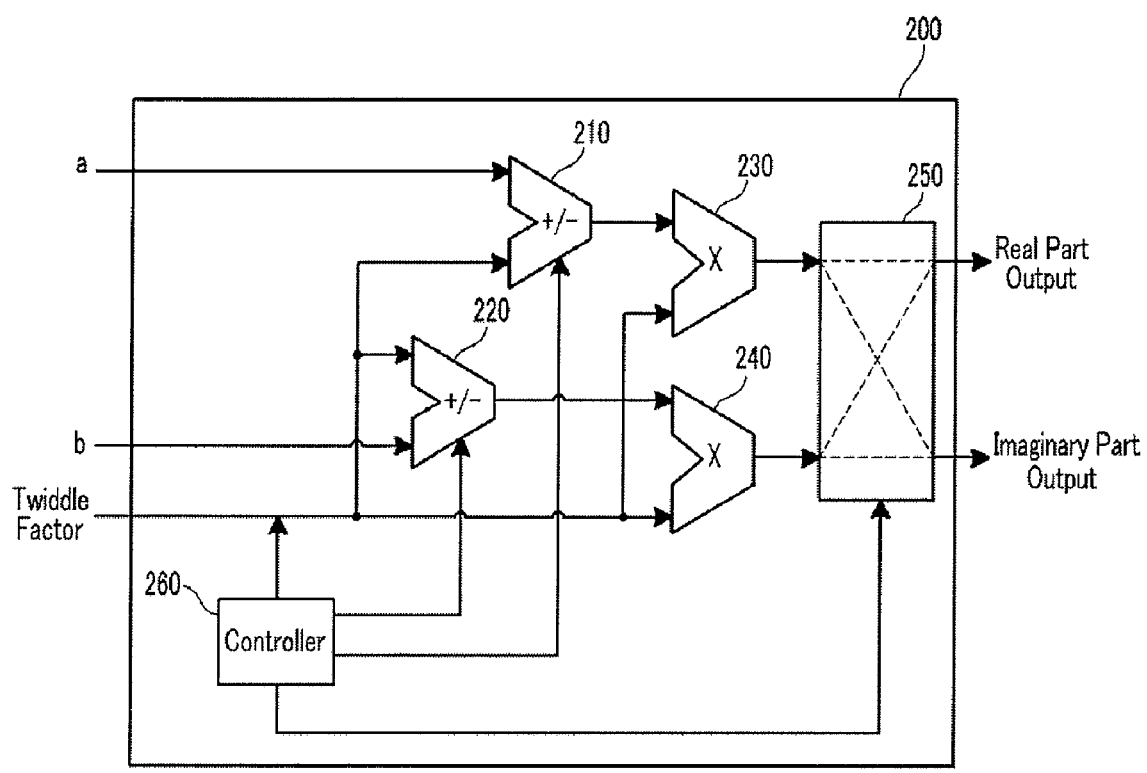
FIG. 6 is a diagram illustrating the structure of a complex multiplier 200 according to an exemplary embodiment of the present invention.

FIG. 6 is a diagram illustrating the structure of the complex multiplier 200 according to the exemplary embodiment of the present invention.

As shown in FIG. 6, the complex multiplier 200 according to the exemplary embodiment of the present invention includes a first adder/subtracter 210, a second adder/subtracter 220, a first multiplier 230, a second multiplier 240, a multiplexer 250, and a controller 260.

The first adder/subtracter 210 is driven under the control of the controller 260 to selectively perform an addition or subtraction operation on a, which is the real part of a complex number (a+jb) input to the FFT, and a twiddle factor input from the twiddle factor generator 100.

The second adder/subtracter 220 is driven under the control of the controller 260 to selectively perform an addition or subtraction operation on b, which is the imaginary part of the complex number (a+jb) input to the FFT, and the twiddle factor input from the twiddle factor generator 100.

The first multiplier 230 multiplies the signal output from the first adder/subtracter 210 by the twiddle factor input from the twiddle factor generator 100, and outputs the result to the multiplexer 250.

The second multiplier 240 multiplies the signal output from the second adder/subtracter 220 by the twiddle factor input from the twiddle factor generator 100, and outputs the result to the multiplexer 250.

The multiplexer 250 selectively outputs the signals output from the first adder/subtracter 210 and the second adder/subtracter 220 as a real part output signal and an imaginary part output signal under the control of the controller 260, respectively.

The controller 260 selectively transmits the twiddle factors stored in the twiddle factor storage unit 130 of the twiddle factor generator 100 to the first adder/subtracter 210, the second adder/subtracter 220, the first multiplier 230, and the second multiplier 240, and controls the operations of the first adder/subtracter 210, the second adder/subtracter 220, and the multiplexer 250.

Next, operation of the complex multiplier 200 according to the exemplary embodiment of the present invention will be described.

First, it is assumed that the twiddle factor generator 100 stores the values of sin θ, cos θ, a·tan θ, and b·tan θ. The controller 260 transmits the values of b·tan θ and a·tan θ to the first adder/subtracter 210 and the second adder/subtracter 220, respectively. The controller 260 controls the first adder/subtracter 210 to subtract b·tan θ from a, which is a real part of the complex number (a+jb), and controls the second adder/subtracter 220 to add a·tan θ and b, which is the imaginary part of the complex number (a+jb)

The controller 260 transmits the value of cos θ to both the first multiplier 230 and the second multiplier 240. The first multiplier 230 multiplies the value of cos θ by the signal transmitted from the first adder/subtracter 210, that is, the subtracted value a−b·tan θ, and transmits the result of the multiplication to the multiplexer 250. The second multiplier 240 multiplies the value of cos θ by the signal transmitted from the second adder/subtracter 220, that is, the added value a·tan θ+b, and transmits the result of the multiplication to the multiplexer 250.

The controller 260 controls the multiplexer 250 to output the signal transmitted from the first multiplier 230, that is, the value of cos θ·(a−b·tan θ), as a real part output signal and to output the signal transmitted from the second multiplier 240/, that is, the value of cos θ·(a·tan θ+b), as an imaginary part output signal.

Next, the values of sin θ, cos θ, a·cot θ, and b·cot θ stored in the twiddle factor generator 100 will be described.

The controller 260 transmits the value of b·cot θ to the first adder/subtracter 210, and transmits the value of a·cot θ to the second adder/subtracter 220. The controller 260 controls the first adder/subtracter 210 to add a, which is the real part of the complex number (a+jb), to b·cot θ, and controls the second adder/subtracter 220 to subtract b, which is the imaginary part of the complex number (a+jb), from a·cot θ.

The controller 260 transmits the value of sin θ to both the first multiplier 230 and the second multiplier 240. The first multiplier 230 multiplies the signal transmitted from the first adder/subtracter 210, that is, the added value a+b·cot θ. by sin θ, and transmits the resulting value to the multiplexer 250. The second multiplier 240 multiplies the signal transmitted from the second adder/subtracter 220, that is, the subtracted value a·cot θ−b, by sin θ and transmits the resulting value to the multiplexer 250.

The controller 260 controls the multiplexer 250 to output the signal transmitted from the first multiplier 230, that is, the value of sin θ·(a+b·cot θ), as an imaginary part output signal and to output the signal transmitted from the second multiplier 240, that is, the value of sin θ·(a·cot θ−b), as a real part output signal.

The twiddle factor generator 100 according to the exemplary embodiment of the present invention calculates the values of a·tan θ and b·tan θ, or the values of a·cot θ and b·cot θ, in addition to the values of sin θ and cos θ corresponding to a predetermined phase rotation value, and outputs the calculated values to the complex multiplier 200. In this way, the complex multiplier 200 according to the exemplary embodiment of the present invention has a smaller number of multipliers than the general complex multiplier 10 shown in FIG. 1, which makes it possible to simplify the design of a hardware structure of the FFT.

The exemplary embodiments of the present invention may be realized by not only the above-described apparatus and/or method, but also by programs for allowing a computer to execute the functions corresponding to the exemplary embodiments of the present invention and a recording media having the programs recorded thereon. It will be understood that those skilled in the art can easily realize the programs and the recording media from the above-described exemplary embodiments of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiments of the present invention, it is possible to achieve a complex multiplier having a simplified hardware design.

What is claimed is:

1. A complex multiplier for multiplying an input complex number by a twiddle factor and outputting the resulting value, comprising:
    a first adder/subtracter that adds the real part of the complex number and a first twiddle factor or subtracts the first twiddle factor from the real part of the complex number according to a first signal;
    a second adder/subtracter that adds the imaginary part of the complex number and a second twiddle factor or subtracts the second twiddle factor from the imaginary part of the complex number according to a second signal;
    a first multiplier that multiplies the value obtained by the first adder/subtracter by a third twiddle factor and outputs the resulting value;
    a second multiplier that multiplies the value obtained by the second adder/subtracter by a fourth twiddle factor and outputs the resulting value;
    a multiplexer that selectively outputs the values output from the first and second multipliers as a real part output signal and an imaginary part output signal according to a third signal; and
    a controller that provides the first to third signals,
    wherein the first twiddle factor is obtained by multiplying the imaginary part by the value of a first function or a second function corresponding to a phase rotation value that is set in a first area in which the first function is linear and a second area in which the second function is linear, and
    the second twiddle factor is obtained by multiplying the real part by the value of the first or second function corresponding to the phase rotation value that is set in the first and second areas.

2. The complex multiplier of claim 1,
    wherein, when the absolute value of the first or second function is within a first range, the controller controls the first adder/subtracter to perform the subtraction operation and the second adder/subtracter to perform the addition operation, and
    when the absolute value of the first or second function is outside the first range, the controller controls the first adder/subtracter to perform the addition operation and the second adder/subtracter to perform the subtraction operation.

3. The complex multiplier of claim 1,
    wherein the third and fourth twiddle factors are values of a third function that is a sine function corresponding to the phase rotation value, or values of a fourth function that has a phase difference of 90 degrees from the third function, and
    each of the first and second functions is a function obtained by dividing the third function by the fourth function or a function obtained by dividing the fourth function by the third function.

4. A twiddle factor generator for generating a twiddle factor corresponding to a predetermined phase rotation value and transmitting the twiddle factor to a complex multiplier, comprising:
    a first twiddle factor generating unit that multiplies a first or second function corresponding to the phase rotation value in a first area in which the first function is linear and a second area in which the second function is linear by the real part and the imaginary part of an input complex number to calculate a first value and a second value;
    a second twiddle factor generating unit that calculates a third value, which is the value of a third function that is a sine function corresponding to the phase rotation value, and a fourth value, which is the value of a fourth function that has a phase difference of 90 degrees from the third function; and
    a twiddle factor storage unit that receives and stores the first to fourth values from the first and second twiddle factor generating units and selectively outputs the received values.

5. The twiddle factor generator of claim 4, further comprising:
    a controller that controls the first and second twiddle factor generating units and the twiddle factor storage unit.

6. The twiddle factor generator of claim 5,
    wherein the first twiddle factor generating unit includes:
    a twiddle factor calculating unit that calculates a seventh value and an eighth value that are approximate to a fifth value and a sixth value obtained by subtracting a predetermined value from the first and second values or the absolute values of the first and second functions, and outputs the seventh and eighth values, under the control of the controller that determines whether the absolute values of the first and second functions are within a first range; and
    a twiddle factor determining unit that transmits the first and second values to the twiddle factor storage unit without performing an operation, and adds a predetermined value to the seventh and eighth values and transmits the added values to the twiddle factor storage unit.

7. The twiddle factor generator of claim 6,
    wherein each of the first and second functions is a function obtained by dividing the third function by the fourth function or a function obtained by dividing the fourth function by the third function,
    the absolute value is within the range of 0 to 1, and
    the predetermined value is 0.5.

8. The twiddle factor generator of claim 6,
    wherein the twiddle factor calculating unit includes:
    first to (N−1)-th low-order bit removing units each of which divides the real part and the imaginary part by different multiples of 2 and outputs the divided values; and a twiddle factor selecting unit that selectively transmits the first value, the second value, the seventh value, and the eighth value to the twiddle factor determining unit, under the control of the controller.

9. The twiddle factor generator of claim 8,
wherein each of the first to (N−1)-th low-order bit removing units is composed of N bits,
the first to (N−1)-th low-order bit removing units remove one to (N−1) bits from the real part and the imaginary part, respectively, and output the bits, and
the twiddle factor calculating unit further includes:
at least one adder or subtracter that performs an addition operation or a subtraction operation on one or more output values from the first to (N−1)-th low-order bit removing units, and transmits the resulting value to the twiddle factor selecting unit.

10. The twiddle factor generator of claim 9,
wherein the first low-order bit removing unit divides the real part and the imaginary part by a predetermined value and outputs the divided values, and
the twiddle factor determining unit includes:
a first adder that adds a signal output from the twiddle factor selecting unit and a signal output from the first low-order bit removing unit; and
a multiplexer that selectively outputs the signal output from the twiddle factor selecting unit and the signal output from the first adder to the twiddle factor storage unit.

11. The twiddle factor generator of claim 4,
wherein one of the first and second functions is a tangent function and the other function is a cotangent function.

* * * * *